United States Patent [19]

Wisniewski

[11] Patent Number: 5,722,124
[45] Date of Patent: Mar. 3, 1998

[54] FASTENER CLIP ASSEMBLY

[76] Inventor: David M. Wisniewski, 7351 Metz, Shelby Township, Macomb County, Mich. 48316

[21] Appl. No.: 785,891

[22] Filed: Jan. 21, 1997

Related U.S. Application Data

[63] Continuation-in-part of Ser. No. 677,093, Jul. 9, 1996.
[51] Int. Cl.⁶ .............................. A44B 21/00; F16B 19/00
[52] U.S. Cl. .............................. 24/295; 411/508; 411/913
[58] Field of Search ..................... 24/293, 295, 289, 24/297, 625, 607, 573, 572; 52/718.01–718.03, 716.6, 716.7; 411/508–510, 182, 912, 913, 914; 403/329, 326, 407.1, 405.1

[56] References Cited

U.S. PATENT DOCUMENTS

| | | |
|---|---|---|
| 2,590,264 | 3/1952 | Meyers et al. ............ 24/295 |
| 3,069,963 | 12/1962 | Meyer .................... 24/295 |
| 3,136,350 | 6/1964 | Rapata . |
| 3,310,929 | 3/1967 | Garvey . |
| 3,374,577 | 3/1968 | Salloum . |
| 3,378,983 | 4/1968 | Anderson . |
| 3,486,158 | 12/1969 | Soltysik et al. . |
| 3,933,076 | 1/1976 | Tanaka . |
| 4,103,400 | 8/1978 | Munse . |
| 4,630,338 | 12/1986 | Osterland et al. . |
| 4,784,430 | 11/1988 | Biermacher . |
| 4,865,505 | 9/1989 | Okada ................... 411/913 X |
| 4,971,500 | 11/1990 | Benoit et al. ............ 411/913 X |
| 5,086,603 | 2/1992 | Graf et al. ............... 52/718.1 |
| 5,095,592 | 3/1992 | Doerfling ................. 24/295 |
| 5,129,768 | 7/1992 | Hoyle et al. ............. 411/913 X |
| 5,229,175 | 7/1993 | Seabolt ................... 24/292 X |
| 5,249,900 | 10/1993 | Mitts ..................... 411/508 |
| 5,263,233 | 11/1993 | Kim et al. ............... 24/295 |
| 5,310,298 | 5/1994 | Hwang .................. 411/913 X |
| 5,367,751 | 11/1994 | DeWitt ................... 24/295 |
| 5,458,365 | 10/1995 | Rogers et al. . |
| 5,507,545 | 4/1996 | Krysiak . |

FOREIGN PATENT DOCUMENTS

| | | |
|---|---|---|
| 1477535 | 4/1967 | France . |
| 1250688 | 9/1967 | Germany . |
| 1389829 | 4/1975 | United Kingdom . |

*Primary Examiner*—Peter M. Cuomo
*Assistant Examiner*—Robert J. Sandy
*Attorney, Agent, or Firm*—Gifford, Krass, Groh, Sprinkle, Patmore, Anderson & Citkowski,P.C.

[57] ABSTRACT

A fastener clip assembly for securing in a non-rotative fashion a first material to a second material includes a substantially planar and polygonal shaped base member and a plurality of four engaging members. The engaging members extend substantially upwardly from associated sides of the base. A laterally projecting angled tab portion extends from each engaging member to a next succeeding engaging member and both the angled tab portions and engaging member faces are provided with aligning apertured portions. Seating portions extend from the engaging members and secure the extending tab portions with their associated engaging member so that, in combination, the fastener clip exhibits an outwardly directed and resilient bias. The engaging members of the clip are resiliently biased so as to insert through a central opening in the second material and to locking engage the second material in a non-rotative fashion.

3 Claims, 2 Drawing Sheets

FASTENER CLIP ASSEMBLY

CROSS-RELATION WITH COPENDING APPLICATIONS

The present application is a continuation-in-part of U.S. Application Ser. No. 08/677,093, filed Jul. 9, 1996, for a fastener clip assembly.

BACKGROUND OF THE INVENTION

1. Field of the Invention

The present invention relates generally to fasteners and, more particularly, to an improved fastener clip assembly for fixedly attaching a first particularly shaped member to a second particularly shaped member.

2. Description of the Prior Art

Fastener assemblies are well known in the art for attaching first and second members together, particularly those which exhibit different material properties, such as metal and plastic. Such types of fasteners are particularly useful for attaching the plastic trim to the inside and outside surfaces of a vehicle. The objective of these fasteners is to fixedly retain the panels and the like in place relative to the underlying body surfaces in a hidden manner and in response to any inadvertent force applications to the panel.

Conventional fasteners of this type which are known in the art typically include a substantially planar base surface and first and second upwardly extending engaging fingers. A first member is secured to the base of the fastener and the fingers are resiliently biased inwardly upon installation of a second member so that they adopt an outwardly directed spring loaded effect to securely fasten the second member.

A major shortcoming of such fasteners is that they tend to spin or spiral when the first and second members are secured together, resulting in uneven location and movement of the respective members. This is directly a result of the limited area of contact provided between the two side surfaces of the fastener and the associated member being connected. Also, the fingers tend to move out of alignment relative to one another as a result of the loading forces incurred when engaging the second member, the result again being uneven location and undesirable movement of the first member relative to the second member.

U.S. Pat. No. 3,136,350, issued to Rapata, teaches a plastic screw anchor which is applied to an apertured workpiece and is constructed to permit the insertion of a conventional screw member. As is best illustrated in FIGS. 1–3, the screw anchor includes a flat head section and first, second, third and fourth tapering entering end portions which facilitate the insertion of the anchor member into the workpiece aperture. Axially directed slots extend along between the tapering end portions and terminate short of the entering ends of the shank section in a peripherally continuous entering end portion which serves to integrally secure the ends of the tapering end portions together. The continuous end portion preserves to retain the outer or entering ends of the separate and flexible side elements of the anchor section together during the application of the screw element and ensures proper location of the anchor member.

The primary shortcoming of the plastic screw anchor device taught by Rapata is that the continuous entering end portion which interconnects the individual tapering end portions is not reinforced to any extent and consequently does not provide any form of durable and fracture resistant load carrying ability to the anchor device. Consequently, the Rapata device would not be well suited for application as a fastener clip for attaching a first material such as a vehicle dashboard or door panel to a second material such as an underlaying portion of a vehicle body, such a fastener clip combining the ability to provide constant weight supporting and resilient load carrying capabilities in a resilient and outwardly biased fashion.

SUMMARY OF THE PRESENT INVENTION

The present invention is a fastener clip assembly for attaching a first material to a second material in a secure and hidden fashion. The first material is typically a plastic interior panel for use in a vehicle and the second material a metal bracket forming a portion of the vehicle structure.

The clip assembly includes a substantially planar and polygonal shaped base member having a centrally formed aperture. A plurality of four engaging members extend substantially upwardly from associated sides of the base member and each include an inwardly contoured pedestal, an extending intermediate portion and a reverse angled upper portion which terminates in an inwardly curved tip.

The engaging members each include interengaging means which provide the function of maintaining the engaging members in an aligned and resiliently outwardly biased load bearing relationship. An aperture is formed through a planar upper portion of each of the engaging members and each engaging member further includes a laterally projecting and angled tab portion. An additional aperture is formed at a remote end of each of the tab portions and each of the tab portions is configured to abut a next succeeding engaging member so that the apertures in the angled tabs are in alignment with the apertures in the planar upper portions. Each of the engaging members terminates at an upper end in an inwardly and downwardly curled engaging finger portion which passes through the aligned apertures and effectively sandwiches the tab portions to their respective succeeding engaging members. In this fashion, the engaging members are arranged in a resilient load bearing and outwardly biased manner for effectively supporting a first overlaying material to a second substrate material over an extended useful life.

The interior plastic panel which makes up the first material normally includes an engaging portion which projects from an inner surface and which is received within the central aperture in the base member. Outwardly flared stop tabs are formed on the sides of the engaging portion to fixedly secure within the fastener clip upon attachment of the first material.

In use, the fastener clip usually has already been secured to the metal bracket of the second material by pushing the engaging members through a central opening of the bracket, thus causing the engaging members to compress inwardly. The bracket thus becomes seated in a fixed and non-rotative manner around the intermediate portions of the engaging members once the reverse angled upper portions of the engaging members clear the bracket opening and bias in an outwardly fashion.

BRIEF DESCRIPTION OF THE DRAWING

Reference will now be made to the attached drawing, when read in combination with the following specification, wherein like reference numerals refer to like parts throughout the several views, and in which.

DESCRIPTION OF THE PREFERRED EMBODIMENT

Figure 1:
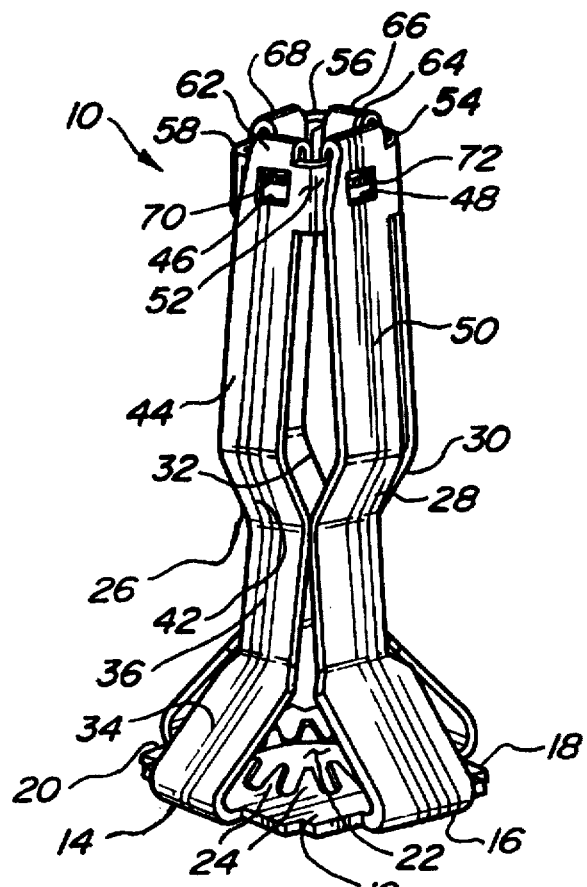
FIG. 1 is an overall view in perspective of the fastener clip assembly according to the present invention.

Referring to FIG. 1, a fastener clip assembly 10 is shown according to the present invention for securing a first material to a second material in a resilient load-carrying, fixed, hidden and non-rotative manner. As will be subsequently described with reference to the view shown in FIG. 6, the fastener clip 10 according the invention is particularly useful for attaching a plastic interior trim panel to a metal bracket forming a portion of a vehicle.

Referring again to FIG. 1, the clip assembly 10 includes a substantially planar and polygonal shaped base member 12 having a first side 14, a second side 16, a third side 18 and a fourth side 20. It is noted that the polygonal shape of the base member 12 can have any other number of sides, ranging from a triangle to a circle which is defined as a polygon with an infinite number of sides. Formed centrally within the base member 12 is an aperture 22 which is bounded by a perimeter defined by a plurality of angled portions 24. The portions 24 project in a generally inwardly and upwardly radial fashion to define biasing members surrounding the base member aperture 22. The aperture 22 is formed by a generally circular shape, but can begin as any type profile shape. The purpose of the portions 24 is to provide a form of secured and biasing engagement with an engaging portion of the first material as will be subsequently described.

The fastener clip assembly 10 is an improvement over the prior art clip assemblies in that it includes at least three, and preferably, four engaging members. Specifically a first engaging member 26, a second engaging member 28, a third engaging member 30 and a fourth engaging member 32 are arranged around the periphery of the base member 12 and extend substantially upwardly from the sides 14, 16, 18 and 20, respectively. The preferred embodiment as described in the application illustrates a four engaging member arrangement, however it is understood that other pluralities of engaging members in excess of two, such as three, five, etc., may be utilized without departing from the concept of the invention.

Figure 2:
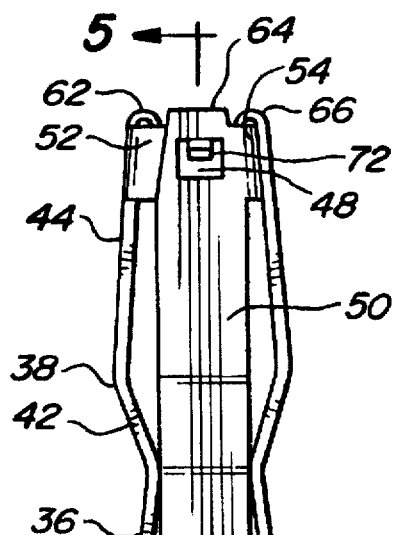
FIG. 2 is a frontal view of the fastener clip similar to that shown in FIG. 1, and illustrating the lip defining the perimeter of the base member aperture and the contour of the engaging members.

Referring again to FIG. 1, and also to FIG. 2, each of the engaging members 26, 28, 30 and 32 are formed as generally upwardly extending and resiliently deflectable members. Specifically, with reference to engaging member 26, each of the members 26–32 include an inwardly contoured pedestal 34, an upwardly extending intermediate portion 36 and a reverse angled upper portion 38. The pedestal 34 is substantially constant in width in an upward direction toward the intermediate portion 36 and the reverse angled upper portion 38 is formed by an outwardly extending leg 42 and a successive inwardly extending leg 44 from a bend connecting to the outward leg 42 to arrive at the desired configuration for the engaging member.

Each of the succeeding engaging members 28, 30 and 32 are formed in an identical fashion as engaging member 26 so that, in combination, they form the clip shape as shown in FIGS. 1–6. The fastener clip assembly 10, including the base member 12 and engaging members 26, 28, 30 and 32, is further preferably constructed of an austempered spring steel but can also be constructed of any durable and high impact-resistant metal or polymer material exhibiting the necessary properties of durability and spring-like resiliency.

Figure 3:
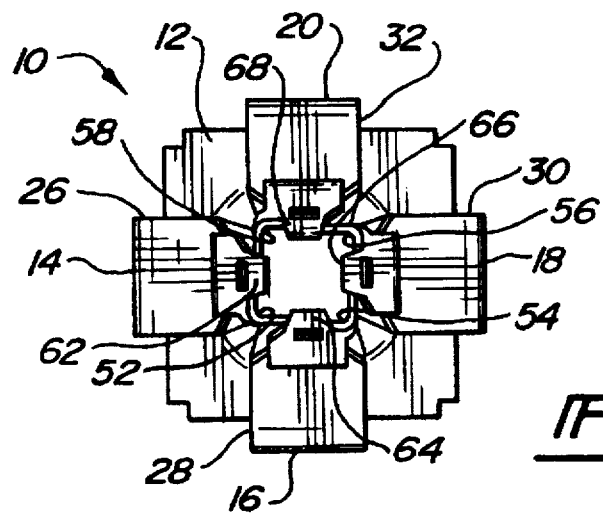
FIG. 3 is a top view of the fastener clip according to the present invention and illustrating the laterally projecting and angled tab portions with aligned apertures and inwardly and downwardly curled engaging finger portions which provide the inter-engaging means between the engaging members.

Referring again to FIGS. 1 and 2, and further to FIG. 3, interengaging means are disclosed for arranging the engaging members in an interconnected, aligned, resilient load bearing and outwardly biasing fashion. The interengaging means are provided by initial aperture portions formed within an upper planar face of each of the engaging members and corresponding to an upper and inwardly extending leg of an associated engaging member 14. Specifically, as is best illustrated in FIG. 1, an aperture 46 is formed at a relatively upper location in the upper and inwardly extending leg 44 and a similar aperture 48 is formed at a substantially identical location in a likewise upper and inwardly extending leg 50 of the next succeeding engaging member 16.

The engaging members each further include a laterally projecting and angled tab portion which extends in a direction towards a succeeding engaging member. Specifically, as is best illustrated in FIG. 1 and in the top view of FIG. 3, a tab portion 52 extends from engaging member 26 in a direction towards engaging member 28, a tab portion 54 extends from engaging member 28 in a direction towards engaging member 30, a tab portion 56 extends from engaging member 30 in a direction towards engaging member 32 and, finally, a tab portion 58 extends from engaging member 32 in a direction towards engaging member 26 to complete the interengaging scheme. The angled tab portions 52, 54, 56 and 58 each extend in a right angle fashion so that, as is best illustrated in the top view of FIG. 3, they form a generally square shape in combination. Proximate to free ends of each of the angled tab portions are located additional apertured portions, best illustrated by apertured portion 60 formed in angled tab portion 58 as evidenced by the cutaway view of FIG. 5 and which is located so as to be in alignment with an apertured portion formed in a succeeding engaging member. Each of the angled tab portions 52, 54, 56 and 58 includes an additional apertured portion located at a remote end which is positioned so as to be in an inwardly spaced alignment with the apertures formed directly within the engaging members (illustrated by apertures 46 and 48).

An inwardly and downwardly curled engaging finger portion is provided at an upper tip of each of engaging members, specifically finger 62 for arm portion 26, finger 64 for arm portion 28, finger 66 for arm portion 30 and finger 68 for arm portion 32. Each of the engaging fingers 62, 64, 66 and 68 include an outwardly facing seating portion, illustrated by seating portions 70 and 72 in FIGS. 1 and 2, which extends through the aligned apertured portions for locating an extending angled tab portion in a fixed and somewhat adjustable manner with respect its associated and succeeding engaging member. As is illustrated in FIG. 1, outwardly facing seating portion 70 located at the end of finger portion 62 seats through the apertured portion of angled gripping tab 58 (not clearly illustrated) in alignment with apertured portion 46 of engaging member 26 and, likewise, outwardly facing seating portion 72 located at the end of finger portion 64 seats through the apertured portion (60 in FIG. 5) of angled gripping tab 52 in alignment with apertured portion 48 of engaging member 28.

The interengaging assembly of engaging members is therefore capable of being resiliently compressed and deflected inwardly towards one another during installation. This is due to the ability of the overlaying apertured portions of the engaging members and associated angled tab portions to deflect in any direction to a limited degree before contacting the associated seating portions which are positioned substantially centrally within the apertured portions. Subsequent to the press-fit installation, the fastener clip then adopts an outwardly resilient bias due to the spring-like nature of the engaging members to securely seat and locate the fastener clip in place relative to the first and second materials.

Figure 4:
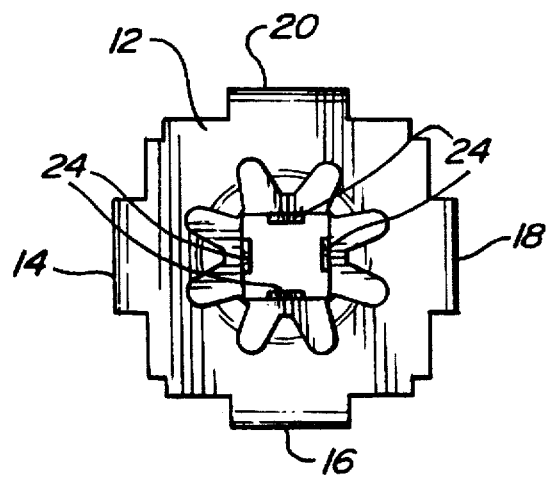
FIG. 4 is a bottom view of the fastener clip according to the present invention and illustrating the planar shaped base and central aperture for receiving an installing portion of the first material.
Figure 5:
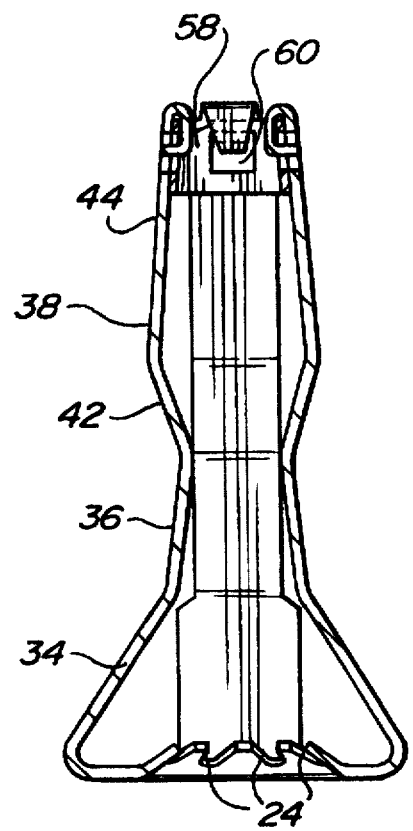
FIG. 5 is a cutaway view taken along line 5—5 of FIG. 2 and better illustrating the arrangement of the angled tab portions in interengaging fashion with the succeeding engaging members to provide the fastener clip with its overall resilient and load bearing capabilities.
Figure 6:
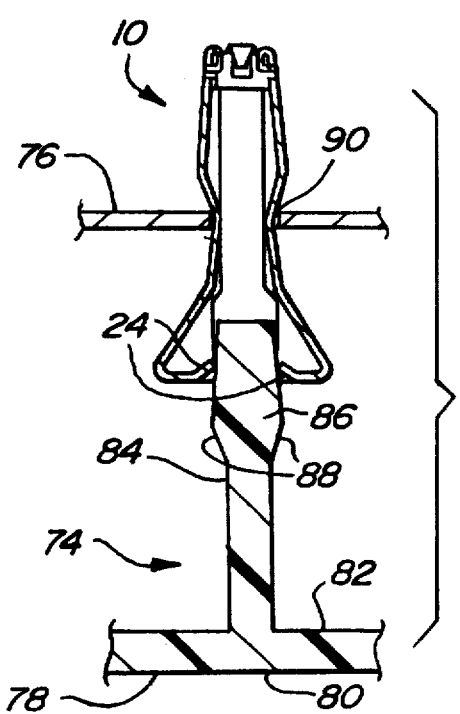
FIG. 6 is an application view illustrating the securing together of first and second materials using the fastener clip assembly according to the present invention.

Finally, referring to FIG. 6, an installation view of the fastener clip assembly 10 is shown for securing together a first material 74 to a second material 76. The first material 74 is typically a plasticized panel of the type normally mounted within a vehicle interior and includes a body 78 with an exterior face 80 and an interior face 82. An engaging portion 84 projects from the interior face 82 and includes an engaging member, illustrated at 86 and which can be provided by a somewhat outwardly flared member which is dimensioned to engage the inwardly radially and angled portions 24 in an inwardly deflecting manner. The end face of the engaging portion 84 is generally rectangular and, as is best illustrated in FIG. 4, deflects the angled portions 24 upwardly and outwardly so that the base of the fastener clip likewise adopts a rectangular cross section. The engaging member is inserted to the extent necessary to firmly secure the engaging member within the open interior of the fastener clip in permanent fashion which results from the angled portions 24 engaging inward slopes 88 of the engaging member.

The second material 76 is preferably a metal bracket which forms a part of the vehicle body and which includes a central opening 90 (not clearly illustrated but apparent from FIG. 6). In a first installation step, the engaging members of the fastener clip 10 are inserted through the central opening 90. As the reverse angled upper portions come into contact with the sides of the opening 90 they resiliently compress inwardly the engaging members until the outward bends, illustrated in the example by the bend between legs 42 and 44 in the engaging member 26, clears the opening 90. At this point, the sides of the central opening 90 seat around the intermediate portions of the engaging members such that the intermediate portions prevent either axial movement or rotation (spinning) of the fastener clip.

In a second installation step, the engaging portion 84 with engaging member 86 having sloped means 88 is pressed through the aperture 22 in the base member 12 and causes the inwardly angled and radial portions 24 surrounding the aperture 22 to partially deflect and collapse in an inward fashion until the lower sloped portions 88 of the engaging member clears the portions 24. At this point, the first material 74 is fixedly secured to the fastener clip 10 in a likewise aligned and non-rotative manner.

From a review of this disclosure, it is evident that the present invention teaches a novel and improved fastener clip assembly which provides the combined advantages of proper locating and alignment of the engaging members which are retained after installation along with the prevention of spinning of the fastener relative to the first and second materials, this being the primary shortcoming of prior art fasteners. The present invention also provides the advantage of being able to secure together two materials according to different compositions in the manner described above.

Having described my invention, additional embodiments will become apparent to those skilled in the art to which it pertains without deviating from the scope of the appended claims.

I claim:

1. A fastener clip assembly for attaching a first material to a second material in a secure and hidden fashion, said fastener clip assembly comprising:

a substantially planar and polygonally shaped base member and an aperture formed through said base member;

a first, a second, a third, and a fourth engaging member extending substantially upwardly from associated sides of said base member;

interengaging means for arranging each of said first, second, third and fourth engaging members in a resilient load bearing and outwardly biased fashion, said interengaging means further comprising each of said engaging members including an aperture portion located proximate an upper end thereof, a laterally projecting and angled tab portion extending from each of said engaging members in a direction towards a successive and associated engaging member, a further apertured portion being formed within a remote end of each of said angled tab portions which is positioned in alignment with said apertured portions located within said succeeding engaging members and in inwardly and downwardly curled engaging finger portion formed at an uppermost end of each of said engaging members, an outwardly facing seating portion being located at an end of each of said engaging finger portions and extending through said aligned apertured portions of said angled tab portion and associated engaging members so that, in combination, said engaging members are permitted a limited degree of movement relative to one another and are aligned and outwardly biased in response to being inwardly deflected; and said base member for securing the first material through said aperture and said engaging members for providing outwardly biased and abutting securement of the second material.

2. The fastener clip assembly as described in claim 1, said engaging members each further comprise an inwardly contoured pedestal, a substantially upwardly extending intermediate portion and a reverse angled upper portion terminating in an inwardly curved tip.

3. The fastener clip assembly as described in claim 2, said intermediate portions of said engaging members establishing, in combination, engaging surfaces which are adapted to engage the second material to prevent rotational movement of said fastener clip relative to the second material upon said clip assembly being adapted to slidably and resiliently engage upon the second material.

* * * * *